Patented Feb. 1, 1938

2,106,754

UNITED STATES PATENT OFFICE 2,106,754

ELECTRIC DISCHARGE DEVICE

Anton Lederer, deceased, late of Vienna, Austria, by Katherine Danzer and Conrad Randa, executors, Vienna, Austria, assignors to Ernest Anton Lederer, Glen Ridge, N. J.

No Drawing. Application November 30, 1932, Serial No. 645,135. In Austria December 1, 1931

29 Claims. (Cl. 250—27.5)

In the co-pending application Sr. No. 508,801, filed January 14, 1931, relating to electric discharge tubes or lamps, there is disclosed a coating material for the hot electrode which contains a considerable amount of emissive substance, which consists chemically of oxygen compounds of the alkaline earth metals or of mixtures of these metals and their oxygen compounds, but which is distinguished from coating substances of similar composition by its color, which deviates from white, especially towards brown. Such coatings are remarkable for their stability under the discharges of rather lengthy periods of operation and especially under arc discharges, i. e., even under severe conditions of operations they liberated no gas, and, particularly, no oxygen. A coating having these desirable qualities is characterized by the emissive substance having a brownish color.

As the result of further development in the light of the above mentioned invention it has been found that the outstanding qualities of the coating material become all the more pronounced the darker the color. The present invention, therefore, proposes to use hot electrode coatings, the active emissive substance of which is of a black or practically black color and the basic constituents of which are similarly constituted to the coating substance mentioned in the aforesaid application. The black or practically black emissive substance consists chemically either of one of the alkaline earth metals or of alloys of the alkaline earth metals among themselves or with metal of the coating carrier or mixtures of substances of the classes just mentioned.

Heretofore some of the above mentioned materials have previously been proposed as coatings for hot electrodes, but none of these known coatings have the characteristically black color of the coating according to the present invention, which color is the characteristic mark of the special qualities of the coating.

It has been discovered that it is not the general chemical composition alone which is the decisive factor in imparting the above mentioned qualities to a hot electrode coating, but that other factors, too, exercise an influence, as for example, the texture of the chemical constituents comprising the coating. The texture of the coating material is determined by the form of treatment to which it is subjected both during the preparation thereof as well as during its application to the hot electrode. It is, therefore, important to ascertain to which external features certain significant qualities of the coating can be attributed. According to the present invention, the black color of the coating, if its chemical composition is such as to include it within the classes of substances mentioned above, insures a high degree of emission and of stability in relation to gas liberation under operating conditions.

It is a feature of black coatings contemplated by the present invention that the selection of the material comprising the carrier for the coating also plays an important role, and it has been found advantageous to use metals or alloys, for the carrier material, which have a higher melting point than nickel. For this purpose was employed, in particular, molybdenum, and under certain circumstances, also tungsten. In the process of manufacture described below such refractory carrier substances afford great advantages hereinafter more specifically noted.

In practicing the present invention, which includes the process as well as the finished coating, the chemical constituents comprising the emissive substance include the alkaline earth peroxides, more particularly, barium peroxide, or other oxygen compounds of the alkaline earth metals which are applied to the coating carrier and then by means of complete extraction of the oxygen, preferably by heating in a high vacuum, is converted into the black emissive substance.

Since the emissivity and stability of the coating is dependent upon the darkness of color thereof, in order to carry the reaction to the desired point and thus impart to the coating a dark, preferably a black color, it is advisable to raise the temperature of the coating carrier during the heating process to a temperature about or above the melting point of nickel, even if only for a short while. Consequently, one may reach, and even surpass, temperatures at which a coating of nickel will be damaged and possibly be melted, and for this reason it is advantageous to use carrier metals or alloys of higher melting point than nickel, as for example, molybdenum or tungsten.

Under certain circumstances, one may raise the temperature of the coating carrier to such an extent that the coating or the alkaline earth metal (preferably barium) constituting the coating begins to vaporize, which is indicative of the reaction having been carried out to the desired degree of completion. Incidentally, it may be noted that through the vaporization of the barium not only is the black color characteristic of the coating developed, but also a getter action is produced simultaneously.

Briefly described, an example of carrying out the present invention, using barium peroxide as the original or basic material, the barium peroxide is finely ground, conveniently in wet condition, it being advantageous to use amylacetate as a suspension liquid. To insure firm adherence of such suspension on the carrier a small quantity of nitrocellulose binder may be added. For instance, 3 parts barium peroxide, 20 parts amylacetate and ½ part of a 10% nitrocellulose solution are well ground. The grinding should be such that the layer applied to the coating carrier contains the peroxide in so finely divided, suspended form that the size of the average particle is so small that the Brown molecular movement can take place. It is, for example, advisable to grind down to a particle size averaging at most 0.004 mm. It has been proven that the small particle size of the peroxide layer exerts a favorable influence upon the texture and qualities of the finished coating substance. After one or more applications (as by spraying) of the peroxide solution (with intervening drying periods) to the coating carrier of the hot electrode, for instance upon the exterior of a small molybdenum tube, this small tube, or the hot electrode, being arranged in the discharge device, whereupon the latter, while subjected to a preliminary heating to about 400° C., is exhausted with a high-vacuum pump. At the next phase of the process of manufacture there follows a lengthy period of the heating of the carrier of the coating layer (and thereby also effecting the heating of the latter) up to the temperatures from 600° C. to 800° C. and over, preferably to about 1000° C. Thereby oxygen is continually liberated by the coating, at the same time corresponding chemical changes take place in the layer. The heating of the coating at this phase of the process must be done to such an extent that the coating layer appears to begin to melt. As soon as this phenomenon comes into being (manifests itself) the carrier of the coating layer should for a very short time, preferably a few seconds, be heated to a much higher temperature, ranging about or above the melting point of nickel, and preferably so high that barium begins to evaporate out of the layer. During this last phase (hot shot) of the process of manufacture, the coloring of the coating is brought to the desired blackness. The coating now possesses those excellent qualities which are mentioned above. Naturally during the whole of the heating process the gases escaping out of the coating layer must be pumped off. Also during the preparation of the coating solution all of the operations should be carried out, as far as possible, under the exclusion of air, carbon dioxide, water and water vapor, because of the chemical activity of the alkaline earth metal compounds in the presence of these substances.

The heating of the coating layer in the interior of the discharge device may be done by electrically heating the carrier directly or indirectly according to the construction of the hot electrode to be heated during the operation of the device. The different heating temperatures can thereby be adjusted by regulating the electric heating voltage. Checking of the process of manufacture is considerably facilitated, if the gases of the vapors escaping from the coating are brought to luminescence. This can, for instance, be done by applying a suitable voltage between the electrodes while the heating of the hot electrode is being carried out. The blue light of the oxygen then shows the escaping of the same from the coating, while a green shimmer or haze during sudden over-heating of the coating layer indicates the evaporation of barium, at which stage the heating preferably should be discontinued.

The hot electrode herein described is specially suitable for gas-filled discharge devices, as for example, rare gas lamps, metal vapor lamps, rectifiers, etc., in which in consequence of the high gas or vapor temperature during operation, and in consequence of the ionizing process, particularly difficult operating conditions prevail in these types of devices. The quality of liberating no gases, and particularly no oxygen, even at high temperatures, and, further, the possibility of heating the coatings according to the invention relatively high and thereby achieving great emissivity, plays a significant part. The invention may, however, also be utilized in vacuum and high-vacuum discharge devices employed for wireless telegraphy and telephony, in which the advantages described may, under certain circumstances, also be desirable.

What is claimed is:

1. The process for the manufacture of an electron discharge device having at least one electrode adapted to emit electrons when heated, comprising coating said electrode with a layer of barium peroxide, mounting said electrode in an envelope, subjecting said electrode to a preliminary heat treatment at about 400° C. while exhausting the envelope, when the envelope becomes highly exhausted the temperature is increased from about 600° C. to about 800° C. for a lengthy period followed by an increase of temperature to about 1000° C. until the layer appears to begin to melt, and then finally increasing the temperature for a short time to above the melting point of nickel, at which phase of the process the barium begins to evaporate from the layer, which phenomenon becomes manifest by the layer assuming a black color characteristic.

2. The process for the manufacture of an electron discharge device comprising providing an electron emitter adapted to be heated, said emitter comprising a carrier of molybdenum covered with a layer of an emissive substance consisting of barium in the form of an oxide below the monoxide, mounting said emitter in a vitreous envelope, subjecting said emitter to a preliminary heat treatment at about 400° C. while exhausting the envelope, when the envelope becomes highly exhausted the temperature is increased from about 600° C. to about 800° C. for a lengthy period followed by an increase of temperature to about 1000° C. until the layer appears to begin to melt, and then finally increasing the temperature for a short time to above the melting point of nickel, at which phase of the process the barium begins to evaporate from the layer, which phenomenon becomes manifest by the layer assuming a black color characteristic.

3. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to a preliminary heating while the same is being exhausted, and then, whilst maintaining the vacuum, subjecting the emitting electrode to heat treatments at temperatures successively increased until a temperature is reached at least above the melting point of nickel.

4. A method for the production of an electric discharge tube having at least two electrodes of which at least one is adapted to emit electrons when heated, which comprises providing said electron emitting electrode with a coating at least containing barium peroxide the average size of the particles of which is sufficiently small that it exhibits Brownian movements, mounting said emitting electrode in a tube, exhausting said tube to a relatively high vacuum, subjecting said tube to preliminary heating while the same is being exhausted, and then, whilst maintaining the vacuum, subjecting the emitting electrode to heat treatments at temperatures successively increased until a temperature is reached at least above the melting point of nickel.

5. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating while the same is being exhausted, subjecting the emitting electrode, while maintaining the vacuum, to further heat treatment at about 600° to 800° C. to remove oxygen from the peroxide, and then, whilst still maintaining the vacuum, subjecting the emitting electrode to heat treatments at temperatures successively increased until a temperature is reached at least above the melting point of nickel.

6. A method for the production of an electric discharge tube having at least two electrodes of which at least one is adapted to emit electrons when heated, which comprises providing said electron emitting electrode with a coating at least containing peroxide of an alkaline earth metal, mounting said electrode in a tube, exhausting said tube to a relatively high vacuum, subjecting said tube to a preliminary heating while the same is being exhausted, and then, whilst maintaining the vacuum, subjecting the emitting electrode to heat treatments at temperatures successively increased to above the melting point of nickel.

7. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating while the same is being exhausted, whilst maintaining the vacuum subjecting the emitting electrode to heat treatments at temperatures successively increased to remove oxygen from the peroxide, and then, whilst still maintaining the vacuum, subjecting the emitting electrode to a heat treatment at a temperature increased to above the melting point of nickel.

8. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating of about 400° C. while the same is being exhausted, whilst maintaining the vacuum subjecting the emitting electrode to two successive heat treatments, one at a temperature of about 600° C. to 800° C., and the other at about 1000° C. to remove oxygen from the coating, and then, whilst still maintaining the vacuum, subjecting the emitting electrode to a heat treatment at a temperature above the melting point of nickel.

9. Steps in the production of an electric discharge tube having at least two electrodes, of which at least one is adapted to emit electrons when heated, which consist in coating said electron emitting electrode with a layer at least containing barium peroxide, mounting the electrodes in a tube, heating said electrode in a maintained vacuum for a relatively long time at a moderate temperature sufficient to remove oxygen slowly from the barium peroxide, and then, whilst maintaining the vacuum, heating the electrodes for relatively short periods at temperatures sufficiently increased that further oxygen will be removed from the coating the final heating being above the melting point of nickel.

10. A process of making a thermionic active electrode which comprises supplying a coating containing barium peroxide to an electrode, said peroxide being employed in a finely ground condition suspended in amyl acetate, said amyl acetate having added thereto a solution of collodion, the particles of barium peroxide being on the average below 0.004 mm. in diameter, the resulting suspension being sprayed on the surface of the electrode, applying it in layers and allowing each layer to dry before applying the next until the coating is of sufficient thickness, thereupon building the electrode into a vessel, evacuating the latter to a high vacuum while heating the electrode to a temperature approximating 400° C., thereupon, whilst retaining the vacuum, raising the temperature progressively until oxygen escapes from the peroxide and finally, whilst still retaining the vacuum, increasing the temperature until the coating assumes a black color.

11. An electric discharge device having at least two electrodes of which at least one is adapted to emit electrons when heated, said emitting electrode comprising a carrier of molybdenum covered with a layer formed at least from barium peroxide and activated in accordance with the process set forth in claim 1.

12. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 4.

13. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 5.

14 An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 6.

15. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 7.

16. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 8.

17. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 9.

18. An electric discharge device having at least two electrodes of which at least one is adapted to emit electrons when heated, said emitting electrode comprising a carrier adapted to be heated, and an emitter formed from barium peroxide and applied to said carrier and activated in accordance with the process set forth in claim 10.

19. An electric discharge device having at least two electrodes of which at least one is an electron emitter comprising an emissive substance formed at least from barium peroxide and applied to a carrier adapted to be heat treated in accordance with the process set forth in claim 1, said treatment activating said emissive substance in such a manner that it functions as a getter during the exhaust and then as a source of electrons during the operation of the device.

20. A method for the production of an electric discharge device having at least two electrodes of which at least one is adapted to emit electrons when heated, which comprises providing said electron emitting electrode with successive coatings containing barium peroxide in suspended form, each coating being dried before the next coating is applied, mounting said electrode in a tube, exhausting said tube to a relatively high vacuum, subjecting said tube to preliminary heating while the same is being exhausted, and then, whilst maintaining the vacuum, subjecting the emitting electrode at least to heat treatment at a temperature at least to the melting point of nickel.

21. A method for the production of an electric discharge device having at least two electrodes of which at least one is adapted to emit electrons when heated which comprises the step of coating said emitting electrode with a layer containing barium peroxide in finely divided suspended form, the particle size being sufficiently small that Brown's molecular movement can take place, mounting said electrode in a tube, exhausting said tube to a relatively high vacuum, subjecting said tube to preliminary heating while the same is being exhausted, and then, whilst maintaining the vacuum, subjecting the emitting electrode to heat treatment at a temperature at least to the melting point of nickel.

22. A method for the production of an electric discharge device having at least two electrodes of which at least one is adapted to emit electrons when heated, which comprises providing said electron emitting electrode with successive coatings containing barium peroxide in finely divided form, the particle size being sufficiently small that Brown's molecular movement can take place and each coating being dried before the next coating is applied, mounting said electrode in a tube, exhausting said tube to a relatively high vacuum, subjecting said tube to preliminary heating while the same is being exhausted, and then, whilst maintaining the vacuum, subjecting the emitting electrode to heat treatment at a temperature increased at least to the melting point of nickel.

23. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 20.

24. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 21.

25. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 22.

26. A method for the production of an electric discharge device having at least two electrodes of which at least one is adapted to emit electrons when heated, which comprises providing said electron emitting electrode with a coating containing barium peroxide, mounting said electrode in a tube, exhausting said tube to a relatively high vacuum, subjecting said tube to preliminary heating while the same is being exhausted, and then, whilst maintaining the vacuum, subjecting the emitting electrode to heat treatments at temperatures successively increased at least to the melting point of nickel.

27. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 26.

28. An electric discharge device having at least two electrodes of which at least one is adapted to emit electrons when heated, said emitting electrode comprising a carrier of molybdenum covered with a layer formed at least from barium peroxide and activated in accordance with the process set forth in claim 26.

29. An electric discharge device having at least two electrodes of which at least one is adapted to emit electrons when heated, said emitting electrode comprising a carrier adapted to be heated, and an emitter formed at least from a peroxide of an alkaline earth metal and applied to said carrier and activated in accordance with the process set forth in claim 6.

KATHERINE DANZER,
CONRAD RANDA,
*Executors of Anton Lederer, Deceased.*

CERTIFICATE OF CORRECTION.

Patent No. 2,106,754. February 1, 1938.

KATHERINE DANZER AND CONRAD RANDA,
EXECUTORS OF ANTON LEDERER, DECEASED.

It is hereby certified that error appears in the printed specification of the above numbered patent requiring correction as follows: Page 1, second column, line 39, before the word "of" insert carrier; and same line, for "will" read would; and that the said Letters Patent should be read with these corrections therein that the same may conform to the record of the case in the Patent Office.

Signed and sealed this 17th day of May, A. D. 1938.

(Seal)

Henry Van Arsdale,
Acting Commissioner of Patents.